Dec. 24, 1935.  K. HIEBER  2,025,509
ELECTRIC SOLDERING IRON
Filed May 10, 1934
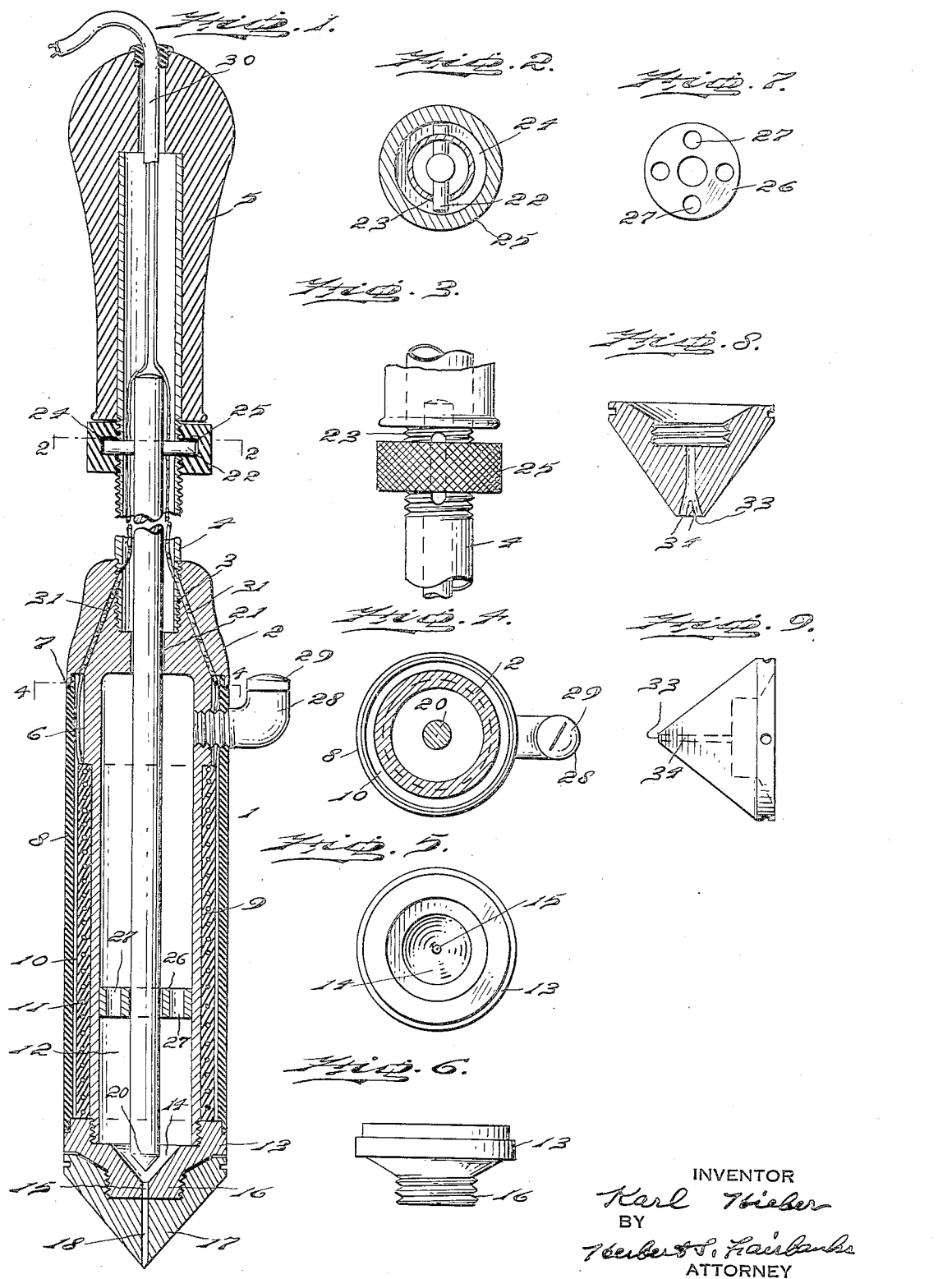
INVENTOR
Karl Hieber
BY
Herbert S. Fairbanks
ATTORNEY Patented Dec. 24, 1935

2,025,509

UNITED STATES PATENT OFFICE 2,025,509

ELECTRIC SOLDERING IRON

Karl Hieber, Philadelphia, Pa.

Application May 10, 1934, Serial No. 724,862

1 Claim. (Cl. 219—27)

The object of my invention is to devise a novel construction and arrangement of an electric soldering iron wherein a supply of liquid solder can be maintained.

With the above and other objects in view as will hereinafter fully appear, my invention comprehends a novel electric soldering iron.

It further comprehends a novel construction and arrangement of soldering iron wherein a heating unit surrounds the chamber for the molten solder and a novel construction of a manually controlled valve is employed to control the discharge of molten solder.

It further comprehends a novel electric soldering iron having a chamber provided with a filling opening so that it is not necessary to take the iron apart to replenish the supply of solder.

Other novel features of construction and advantage will hereinafter clearly appear in the detailed description and the appended claim.

For the purpose of illustrating the invention, I have shown in the accompanying drawing typical embodiments of it, which, in practice, will give satisfactory and reliable results. It is, however, to be understood that the various instrumentalities of which my invention consists can be variously arranged and organized, and my invention is not limited to the exact arrangement and organization of these instrumentalities as herein set forth.

Figure 1 is a sectional plan view of an electric soldering iron embodying my invention.

Figure 2 is a section on line 2—2 of Figure 1.

Figure 3 is a side elevation of a section of the valve controlling member in its closed position.

Figure 4 is a section on line 4—4 of Figure 1.

Figure 5 is a top plan view of the valve seating member.

Figure 6 is a side elevation of the valve seating member.

Figure 7 is a top plan view of a guide member.

Figure 8 is a sectional plan view of another embodiment of soldering point.

Figure 9 is a side elevation of the point seen in Figure 8.

Similar numerals indicate corresponding parts.

Referring to the drawing.

1 designates an electric soldering iron, embodying my invention, 2 designates a body portion which is recessed at its outer end and internally threaded as at 3 to receive a pipe 4, which extends into and is fixed to a grasping handle 5 preferably of insulating material such as for example bakelite or hard rubber. The body portion 2 is tubular and is of reduced diameter a desired distance from its outer end as at 6 to form a shoulder 7 for an outer sleeve 8 preferably of suitable insulating material. The body portion in advance of the reduced portion 6 is still further reduced as at 9 to form a chamber 10 to receive a heating unit 11 surrounding the chamber 12 for the solder. A valve seat 13 in threaded engagement with the forward end of the body portion and sleeve retains the sleeve and heating unit in assembled position. This valve seat closes the forward end of the solder receiving chamber 12 and is provided with a conical valve seat 14 communicating with a discharge passage 15 in an externally threaded forward extension 16. 17 designates the soldering tip or point having a discharge passage 18 opening through it and leading from the passage 15. The soldering tip shown in Figure 1 has a conical contour and is recessed and threaded to receive the threaded extension of the valve seat. The tip is provided with spanner receiving openings 19.

The valve seat 14 cooperates with a conically shaped valve 20, the stem of which has a bearing at 21 in the outer end of the body portion 2. The stem extends rearwardly into the pipe 4. A pin 22 extends transversely through a slot 23 in the pipe 4 and has its free ends extending into an annular groove 24 in a valve controlling member 25 preferably of insulating material and in threaded engagement with the pipe 4. A guide bearing 26 is fixed in the chamber 12, for the valve stem and has circumferentially spaced openings 27 through which the solder can flow. A fitting 28 communicates with the rear end of the chamber 12 to serve as a filling opening for the solder and is provided with a removable plug 29. 30 are the electrical conductors which pass through the rear end of the handle 5 into the pipe 4 and through passages 31 in the body portion to their points of connection with the electric heating unit.

By turning the valve controlling member 25 the valve 20 can be moved towards or away from its seat 14 to control the amount of molten solder passing to the tip or point.

In Figures 8 and 9, I have shown a different form of tip or point 32 in which the forward end is flat as at 33 and two passages 34 are provided which lead from the passage 15 when such tip or point is assembled with the soldering iron.

My present invention has been found in practice to give very advantageous results since a large supply of molten solder is provided the discharge of which is accurately controlled and the iron after once heated can be used for a considerable period of time without reheating.

The solder can be inserted into the heating chamber whenever desired through the filling opening. The point or nose may have any desired contour of discharge opening.

The electric heating unit does not come into contact with the solder, and the valve stem has a close fit at 21 in the body portion so that there is no likelihood of leakage from the rear end of the chamber 12.

It will now be apparent that I have devised a new and useful electric soldering iron, which embodies the features of advantage enumerated as desirable in the statement of the invention and the above description, and while I have, in the present instance, shown and described preferred embodiments thereof which will give in practice satisfactory and reliable results, it is to be understood that these embodiments are susceptible of modification in various particulars without departing from the spirit or scope of the invention or sacrificing any of its advantages.

Having thus described my invention what I claim as new and desire to secure by Letters Patent is:—

In an electric soldering iron, a body having a heating chamber, an electric heating element surrounding said chamber, a valve seat secured to the forward end of said body portion, and having a forwardly converging seat, an apertured tip removably connected with said seat, a valve in the form of a rod having its forward end tapered to engage said seat, the converging valve seat at its inner portion being of greater diameter than the valve or its converging portion, a grasping handle, a tubular connection between the body portion and the handle provided with a longitudinal slot, a pin passing through the valve and slot, and a valve actuating member longitudinally adjustable on said connection and having recesses to receive the ends of said pin.

KARL HIEBER.